(12) United States Patent
Lakshmanamurthy et al.

(10) Patent No.: US 8,805,926 B2
(45) Date of Patent: Aug. 12, 2014

(54) COMMON IDLE STATE, ACTIVE STATE AND CREDIT MANAGEMENT FOR AN INTERFACE

(75) Inventors: Sridhar Lakshmanamurthy, Sunnyvale, CA (US); Robert P. Adler, Santa Clara, CA (US); Mikal C. Hunsaker, El Dorado Hills, CA (US); Michael T. Klinglesmith, Portland, OR (US); Blaise Fanning, Folsom, CA (US); Eran Tamari, Ramat Gan (IL); Joseph Murray, Scottsdale, AZ (US); Rohit R. Verma, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 13/248,232

(22) Filed: Sep. 29, 2011

(65) Prior Publication Data

US 2013/0086139 A1    Apr. 4, 2013

(51) Int. Cl.
*G06F 15/16* (2006.01)

(52) U.S. Cl.
USPC ............................ 709/203; 709/219; 718/100

(58) Field of Classification Search
USPC ......................................................... 709/202
See application file for complete search history.

(56) References Cited

U.S. PATENT DOCUMENTS

| | | |
|---|---|---|
| 5,493,566 A | 2/1996 | Ljungberg et al. |
| 6,009,488 A | 12/1999 | Kavipurapu |
| 6,233,632 B1 | 5/2001 | Meiyappan et al. |
| 6,427,169 B1 | 7/2002 | Elzur |
| 6,611,893 B1 | 8/2003 | Lee et al. |
| 6,694,380 B1 | 2/2004 | Wolrich et al. |
| 6,725,313 B1 | 4/2004 | Wingard et al. |
| 6,810,460 B1 | 10/2004 | Kirkwood |
| 6,816,938 B2 | 11/2004 | Edara et al. |
| 7,065,733 B2 * | 6/2006 | Goodnow et al. ............. 716/104 |
| 7,457,905 B2 | 11/2008 | Gehman |
| 7,506,089 B2 | 3/2009 | Cho et al. |
| 7,573,295 B1 | 8/2009 | Stadler |
| 7,673,087 B1 | 3/2010 | Ansari et al. |

(Continued)

FOREIGN PATENT DOCUMENTS

| | | |
|---|---|---|
| KR | 10-2005-0082834 | 8/2005 |
| KR | 1020050077437 | 8/2005 |
| WO | 2005071553 | 8/2005 |

OTHER PUBLICATIONS

U.S. Appl. No. 13/248,234, filed Sep. 29, 2011, entitled, "Sending Packets With Expanded Headers", by Sridhar Lakshmanamurthy, et al.

(Continued)

*Primary Examiner* — Hamza Algibhah
(74) *Attorney, Agent, or Firm* — Trop, Pruner & Hu, P.C.

(57) ABSTRACT

In one embodiment, the present invention includes method for entering a credit initialization state of an agent state machine of an agent coupled to a fabric to initialize credits in a transaction credit tracker of the fabric. This tracker tracks credits for transaction queues of a first channel of the agent for a given transaction type. The agent may then assert a credit initialization signal to cause credits to be stored in the transaction credit tracker corresponding to the number of the transaction queues of the first channel of the agent for the first transaction type. Other embodiments are described and claimed.

12 Claims, 8 Drawing Sheets

(56) References Cited

U.S. PATENT DOCUMENTS

| | | |
|---|---|---|
| 7,685,346 B2 | 3/2010 | Teh |
| 7,723,902 B2 | 5/2010 | Florian et al. |
| 7,734,856 B2 | 6/2010 | Reinig |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 2002/0038401 A1 | 3/2002 | Zaidi |
| 2003/0088722 A1 | 5/2003 | Price |
| 2003/0126336 A1 | 7/2003 | Creta |
| 2004/0177176 A1 | 9/2004 | Li et al. |
| 2005/0010687 A1 | 1/2005 | Dai |
| 2005/0120323 A1* | 6/2005 | Goodnow et al. ............... 716/18 |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0119432 A1 | 5/2009 | Lee et al. |
| 2009/0235099 A1 | 9/2009 | Branover et al. |
| 2009/0249098 A1 | 10/2009 | Han et al. |
| 2009/0296740 A1 | 12/2009 | Wagh |
| 2010/0199010 A1 | 8/2010 | Goren et al. |
| 2010/0262855 A1 | 10/2010 | Buch et al. |
| 2010/0278195 A1 | 11/2010 | Wagh |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0311213 A1 | 12/2012 | Bender et al. |
| 2013/0054845 A1* | 2/2013 | Nimmala et al. ............... 710/36 |

OTHER PUBLICATIONS

U.S. Appl. No. 13/248,243, filed Sep. 29, 2011, entitled, "Aggregating Completion Messages in a Sideband Interface", by Sridhar Lakshmanamurthy, et al.

U.S. Appl. No. 13/248,252, filed Sep. 29, 2011, entitled, "Providing Error Handling Support to Legacy Devices", by Sridhar Lakshmanamurthy, et al.

U.S. Appl. No. 13/248,263, filed Sep. 29, 2011, entitled, "Providing Multiple Decode Options for a System-On-Chip (SoC) Fabric", by Sridhar Lakshmanamurthy, et al.

U.S. Appl. No. 13/248,270, filed Sep. 29, 2011, entitled, "Supporting Multiple Channels of a Single Interface", by Sridhar Lakshmanamurthy, et al.

U.S. Appl. No. 13/248,276, filed Sep. 29, 2011, entitled, "Issuing Requests to a Fabric", by Sridhar Lakshmanamurthy, et al.

U.S. Appl. No. 13/222,362, filed Aug. 31, 2011, entitled, "Integrating Intellectual Property (IP) Blocks Into a Processor", by Prashanth Nimmala, et al.

U.S. Appl. No. 13/306,244, filed Nov. 29, 2011, entitled, "Providing a Sideband Message Interface for System on a Chip (SoC)", by Robert P. Adler, et al.

U.S. Appl. No. 13/222,354, filed Aug. 31, 2011, entitled, "Providing Adaptive Bandwidth Allocation for a Fixed Priority Arbiter", by Kie Woon Lim, et al.

International Searching Authority, "Notification of Transmittal of the International Search Report and the Written Opinion of the International Searching Authority," mailed Mar. 28, 2013, in International application No. PCT/US2012/056255.

Intel Corporation, "An Introduction to the Intel QuickPath Interconnect," Jan. 2009, pp. 1-22.

Sousek, et al., "PCI Express Core Integration with the OCP Bus," CAST, Inc., 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

U.S. Patent and Trademark Office, Office Action mailed Sep. 18, 2013, in U.S. Appl. No. 13/248,252.

U.S. Patent and Trademark Office, Office Action mailed Jun. 20, 2013 with Reply filed Sep. 18, 2013, in U.S. Appl. No. 13/248,243.

U.S. Patent and Trademark Office, Office Action mailed Apr. 23, 2013 with Reply filed Jul. 22, 2013, in U.S. Appl. No. 13/248,263.

U.S. Patent and Trademark Office, Office Action mailed Jun. 14, 2013 with Reply filed Sep. 9, 2013, in U.S. Appl. No. 13/248,270.

U.S. Patent and Trademark Office, Office Action mailed Jun. 20, 2013 with Reply filed Sep. 17, 2013, in U.S. Appl. No. 13/248,276.

* cited by examiner

COMMON IDLE STATE, ACTIVE STATE AND CREDIT MANAGEMENT FOR AN INTERFACE

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

One feature of interconnects in a PCIe™ system is the concept of various protocol layers, including a transaction layer, a link layer, and a physical layer. Responsibilities with respect to various signaling, power management, and credit mechanisms can be segmented across these layers. As a result, any one of these functions requires execution of state machines or other logic in each of these layers, increasing complexity.

DETAILED DESCRIPTION

Figure 1:
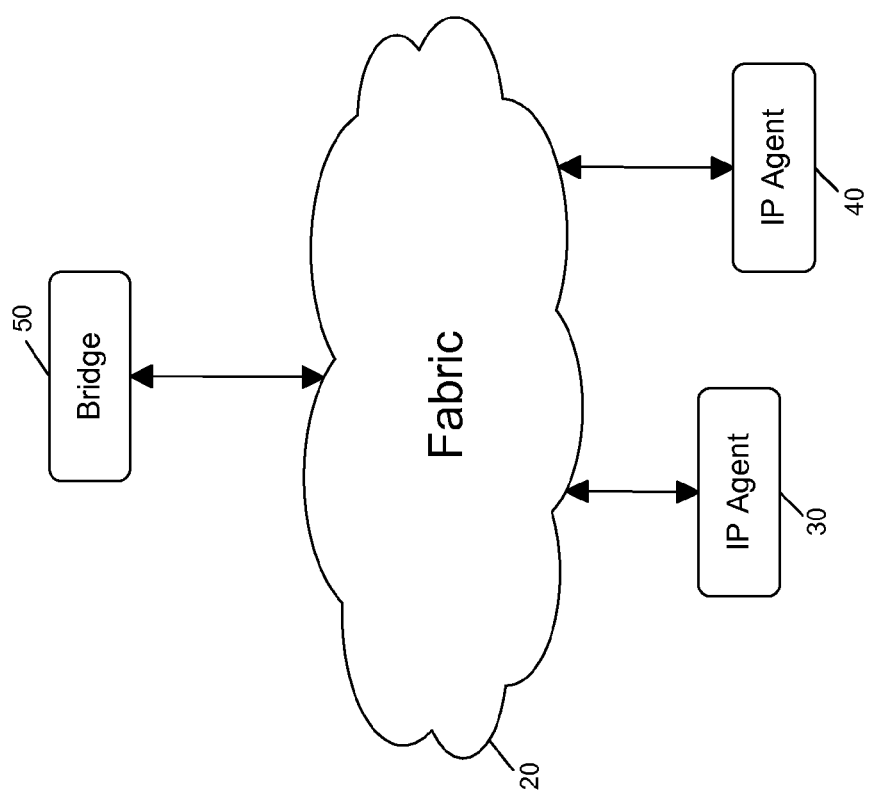
FIG. 1 is a block diagram of a basic interconnect architecture in accordance with an embodiment of the present invention.

Embodiments provide a state machine, referred to herein as an idle state machine (ISM), that can be a common architected interface to support multiple operations including credit initialization, active mode data exchange, and power management. This single state machine, which can be implemented via an agent-based state machine and a corresponding fabric-based state machine, can provide for all interactions via an on-die interconnect between an agent and a fabric with regard to these operations. In this way, all of the above functions can be implemented in a single layer, since on-die communications between different agents can avoid link integrity mechanisms commonly used for off-die communications (e.g., as implemented in a link layer).

In general, an idle state machine in accordance with an embodiment of the present invention provides a handshake between an agent and the fabric. Specific states and their transitions with regard to these two state machines are described in detail below. Fundamentally, the ISM states can be partitioned into three categories: states to support credit initialization; states to support the active mode of the interface; and idle state support. For each of these three major categories, the ISM provides an architected handshake between agent and fabric that supports the major activities that are associated with each category. The result is that the ISM provides a solution that neatly ties together the concepts of credit management, active mode data transmission, and idle state power and clock gating into a single state machine.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
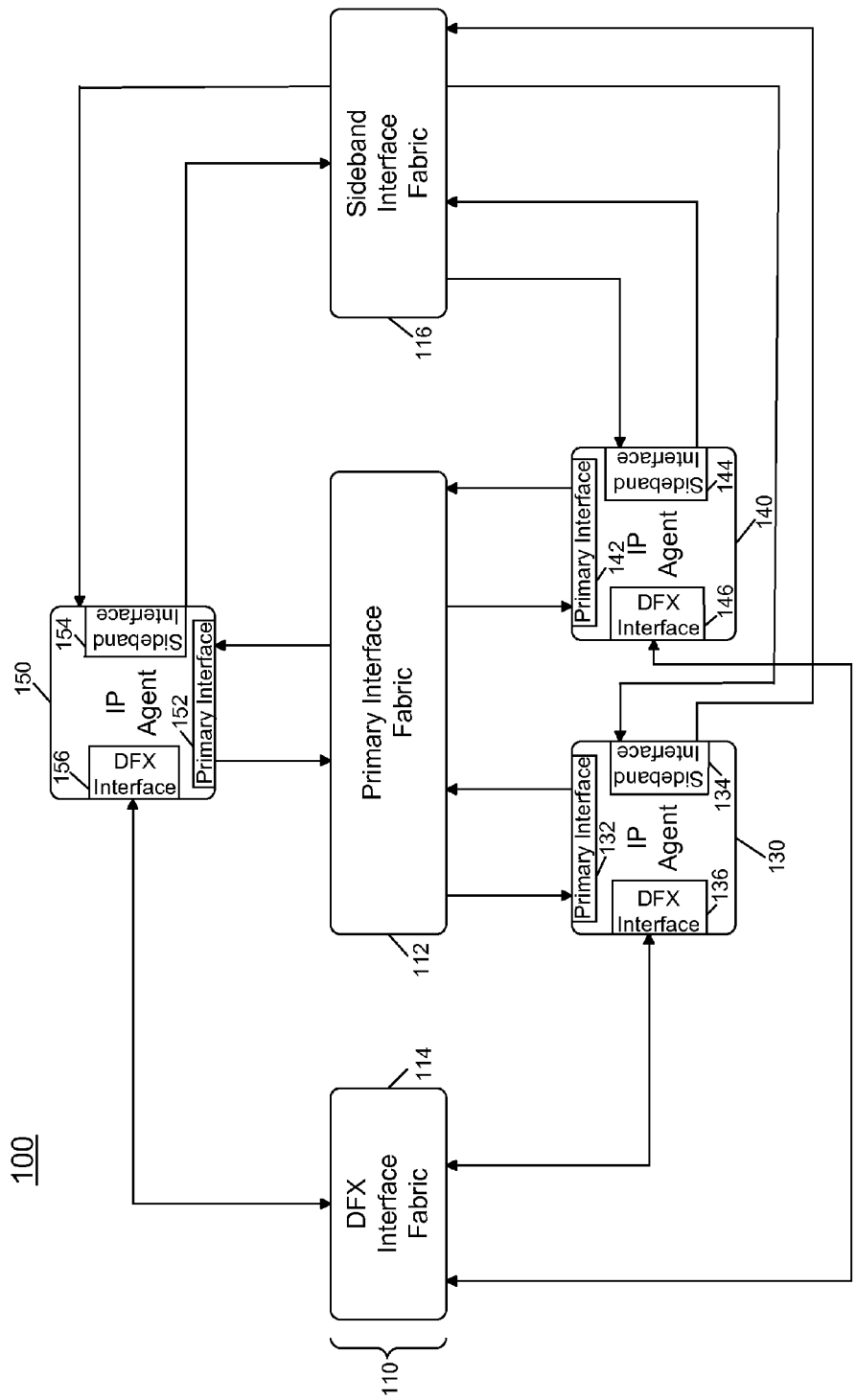
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
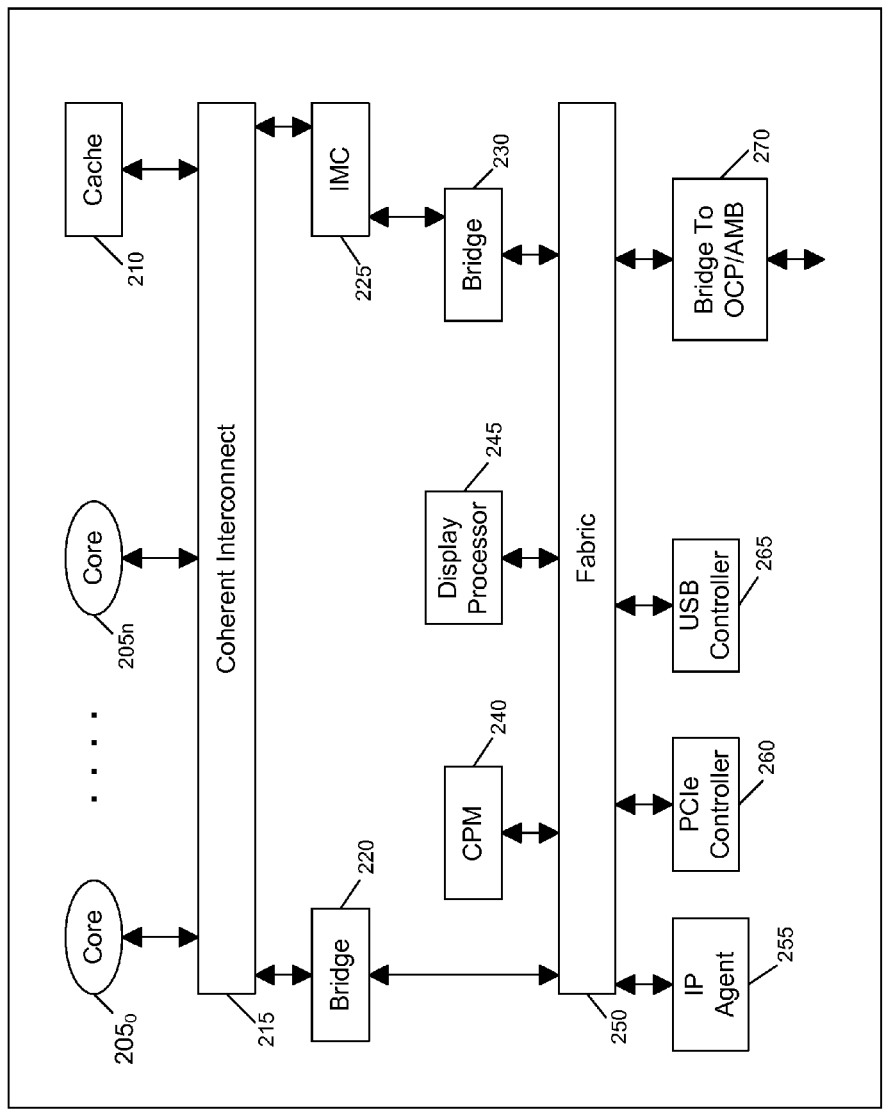
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
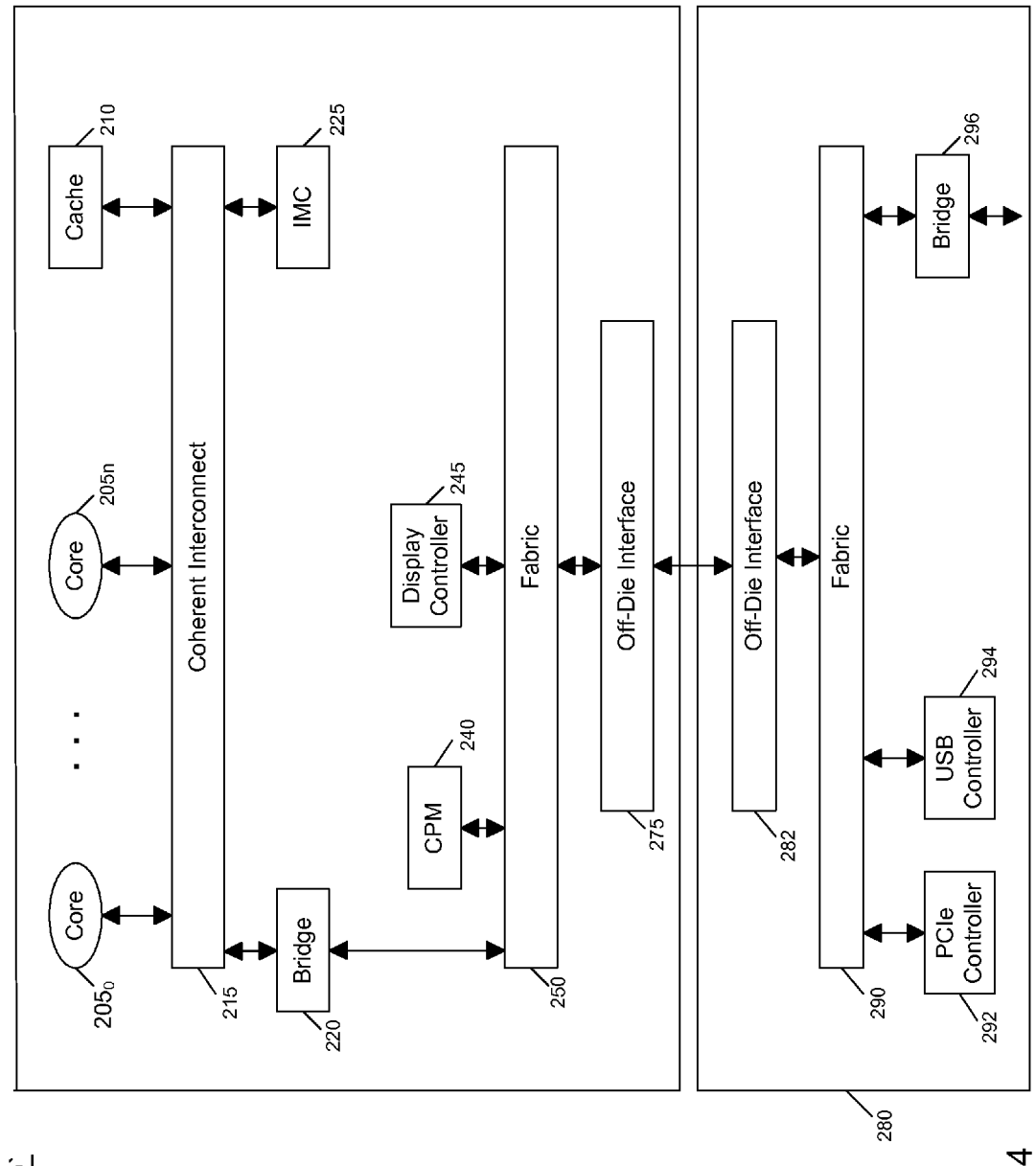
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

In one embodiment, each agent may include an idle state machine on each primary and sideband message interface that it supports. For every ISM implemented by an agent, there is a corresponding ISM implemented in the fabric (or a router). The following Tables 1-4 set forth a description of the different states for the agent and fabric/router ISMs (Tables 1 and 3, respectively), and state transitions for the ISMs (Tables 2 and 4, respectively). These tables also refer to the state transition diagrams of FIGS. 5 and 6 for the agent ISM and fabric ISM, respectively. Note that the discussion is with reference to a single agent and fabric interconnection, but understand that multiple agents and fabrics can be present, with multiple agents interfacing with a single fabric (each by its own agent ISM and corresponding fabric ISM).

TABLE 1

| State | Description |
|---|---|
| CREDIT_REQ | Agent enters this state during run-time to initialize or re-initialize credits. |

TABLE 1-continued

| State | Description |
|---|---|
| CREDIT_INIT | The agent initializes interface credits in this state. The fabric ISM can be in CREDIT_ACK state when an agent starts initializing. |
| CREDIT_DONE | The agent has completed initializing its interface credits. |
| IDLE | The agent is IDLE. An agent can locally gate its interface clock and deassert its interface clock request when it is in this state. |
| ACTIVE_REQ | The agent requests to use the interface or is acknowledging the request of the fabric to use the interface. |
| ACTIVE | The interface is active. In this state the agent can issue puts or credit updates. In this state, the agent can receive puts, grants, and credit updates. |
| IDLE_REQ | The agent no longer requires the use of the interface, has met the ISM IDLE request rules and is requesting to enter IDLE. |

TABLE 2

| Present State | Next State | Description |
|---|---|---|
| CREDIT_REQ | CREDIT_INIT | The fabric ISM is in the CREDIT_ACK state. |
| CREDIT_INIT | CREDIT_DONE | The agent has completed credit initialization on its target interface and the fabric ISM is in the CREDIT_INIT state. The agent ensures that the rules for interface clock gating have been met before entering the CREDIT_DONE state. |
| CREDIT_DONE | IDLE | The fabric ISM is in the IDLE state, indicating that it has completed request credit initialization. |
| IDLE | CREDIT_REQ | All target queues are empty, all credits have been returned and the agent seeks to re-initialize credits or the fabric ISM is in the CREDIT_REQ state. The agent ensures that the rules for interface clock gating have been met before entering the CREDIT_REQ state. |
| IDLE | ACTIVE_REQ | The agent seeks the use of the interface to communicate with the fabric OR the fabric ISM is in the ACTIVE_REQ state AND the agent ISM arc from IDLE to ACTIVE is not implemented. The agent ensures the clock is valid and that all interface clock gating rules are followed before exiting IDLE. |
| IDLE | ACTIVE | The fabric ISM is in the ACTIVE_REQ state. |
| ACTIVE_REQ | ACTIVE | The fabric ISM is in the ACTIVE_REQ state. |
| ACTIVE_REQ | CREDIT_REQ | The fabric ISM is in the CREDIT_REQ state. |
| ACTIVE | IDLE_REQ | The agent satisfies all conditions under which this transition may or must be taken. |
| IDLE_REQ | IDLE | The fabric ISM is in the IDLE state. |
| IDLE_REQ | ACTIVE | The fabric ISM is in the IDLE_NAK state. |

TABLE 3

| State | Description |
|---|---|
| CREDIT_REQ | The fabric enters this state to request to initialize or re-initialize credits. |
| CREDIT_INIT | During this state, the fabric initializes its interface credits. |
| CREDIT_ACK | Fabric acknowledges an agent's request for credit initialization. |
| IDLE | Fabric is allowed to locally gate its interface clock only in this state. |
| ACTIVE_REQ | The fabric requests use of the interface or is acknowledging the request of the agent to the interface. In this state the fabric can receive puts and credit updates. |
| ACTIVE | The interface is active. In this state the fabric can issue puts, grants, credit updates and can decrement target credits. In this state, the fabric can receive puts and credit updates. |
| IDLE_NAK | Fabric is rejecting an agent's request to enter IDLE. In this state the fabric can issue puts, grants, credit updates and can decrement target credits. In this state, the fabric can receive puts, and credit updates. |

TABLE 4

| Present State | Next State | Description |
|---|---|---|
| CREDIT_REQ | CREDIT_ACK | The agent ISM is in the CREDIT_REQ state. Following interface reset de-assertion, the fabric ISM may choose to add additional delay before acknowledging the agent ISM CREDIT_REQ state to ensure that reset has fully propagated to all destinations. |
| CREDIT_ACK | CREDIT_INIT | The agent ISM is in the CREDIT_INIT state. |
| CREDIT_INIT | IDLE | The agent ISM is in the CREDIT_DONE state and the fabric has completed credit initialization for that agent on that interface. |
| IDLE | ACTIVE_REQ | The agent ISM is in the ACTIVE_REQ state OR the fabric requires the interface to communicate with the agent and the agent is in the IDLE state. The fabric ensures that the interface clock is valid and will not be gated after exiting the IDLE state |
| IDLE | CREDIT_REQ | The agent ISM is in the CREDIT_REQ state. The fabric ensures that the interface clock is valid and will not be gated after exiting the IDLE state. |
| ACTIVE_REQ | ACTIVE | The agent is in the ACTIVE state |
| ACTIVE_REQ | CREDIT_REQ | The agent ISM is in the CREDIT_REQ state. Note: as the system is quiesced prior to credit initialization, this arc should never need to be taken, but is included here for robustness. |
| ACTIVE | IDLE | The agent ISM is in the IDLE_REQ state, the fabric does not require the interface to communicate with the agent, and the fabric has not put a new transaction to the agent at the same time the agent indicated it was in the IDLE_REQ state. |
| ACTIVE | IDLE_NAK | The agent ISM is in the IDLE_REQ state, and the fabric requires the use of the IOSF interface to communicate with the agent, or the fabric put a transaction to the agent at the same time that the agent indicated it was in the IDLE_REQ state. |
| IDLE_NAK | ACTIVE | The agent ISM is in the ACTIVE state. |

Figure 5:
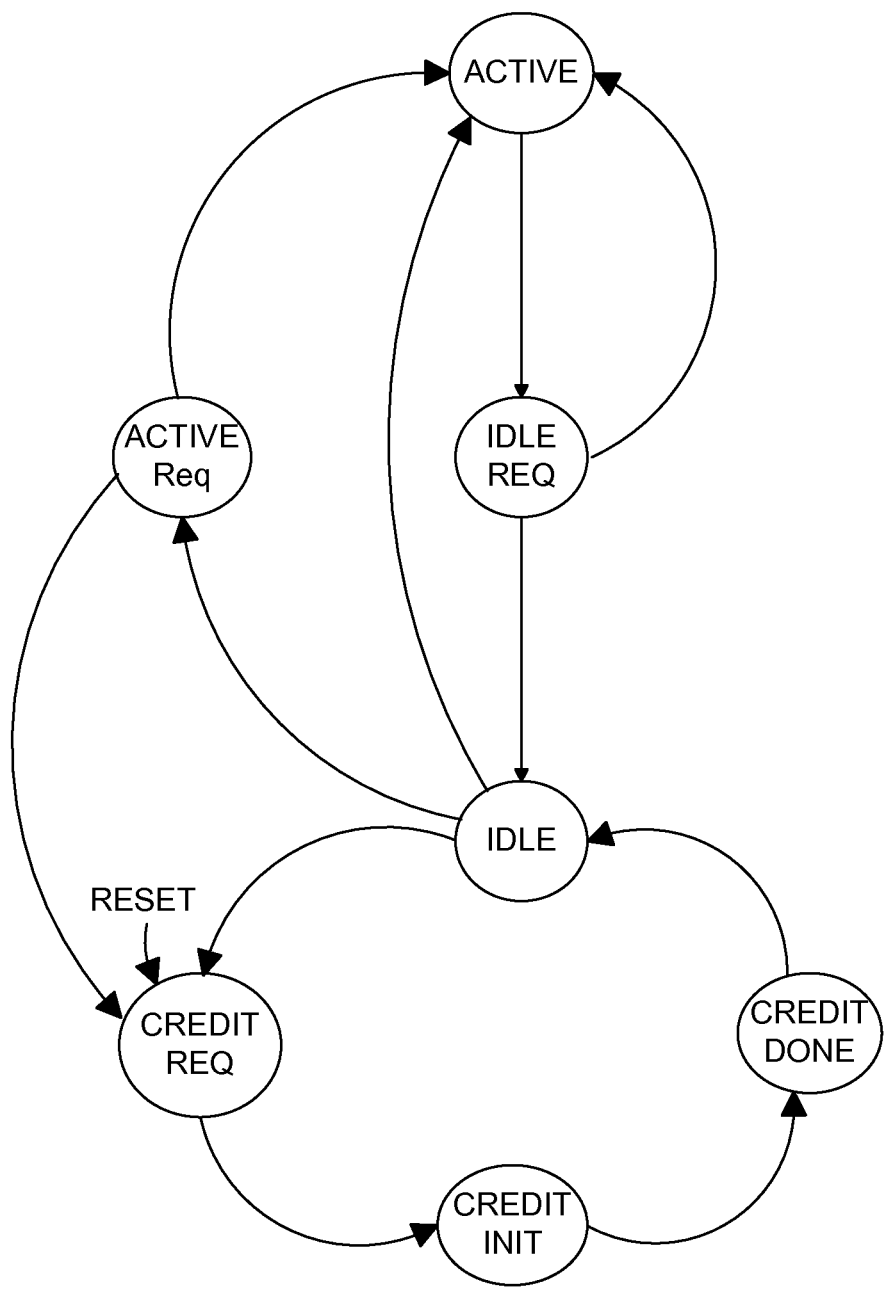
FIG. 5 is a state transition diagram of an agent state machine in accordance with an embodiment of the present invention.
Figure 6:
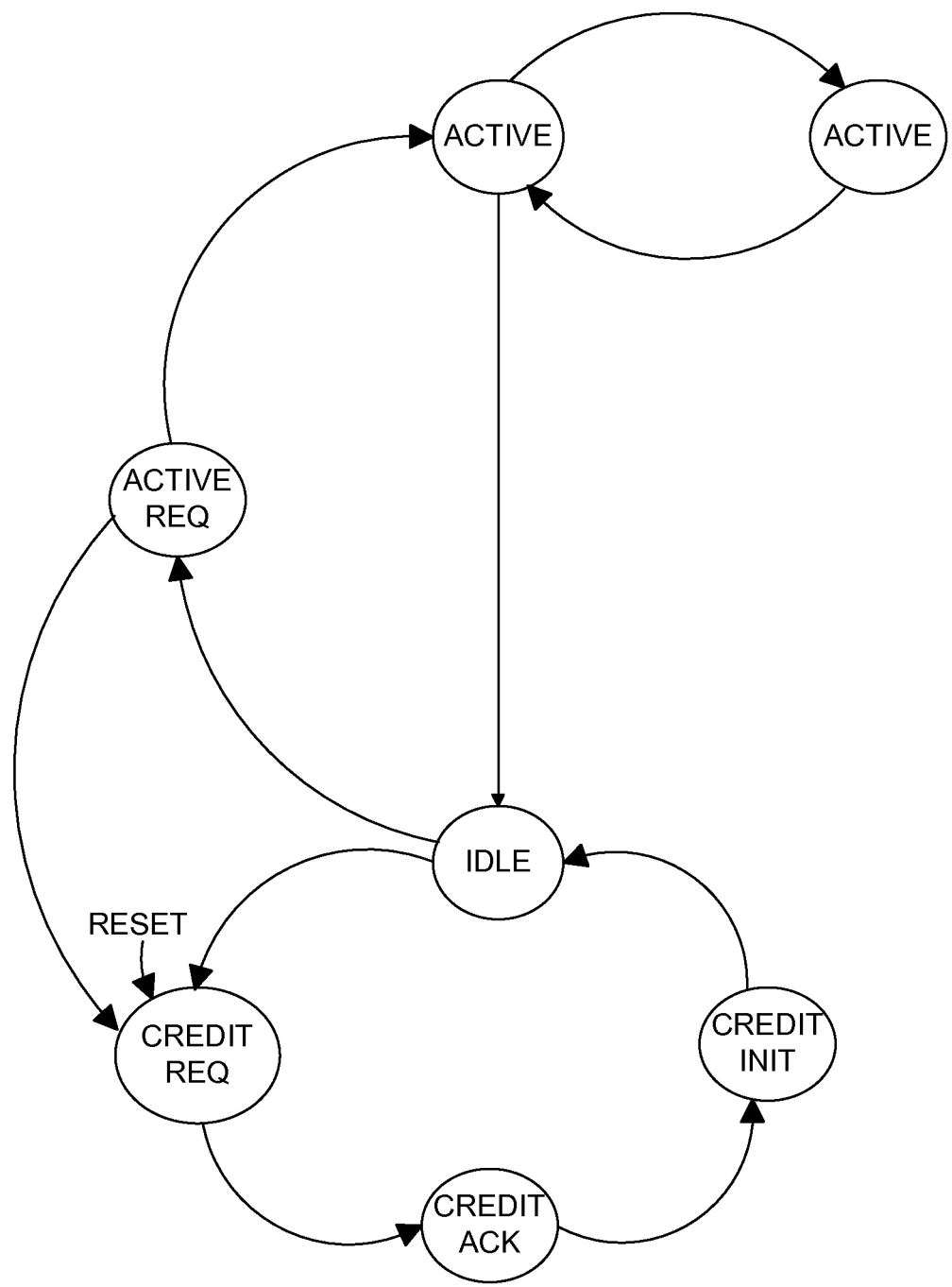
FIG. 6 is a state transition diagram of a fabric state machine in accordance with an embodiment of the present invention.

In the embodiment of the ISMs shown in FIGS. 5 and 6, the interface credit initialization phase can be used to initialize various interface credits including request and transaction credits within a system. This phase may occur shortly after an interface signal reset has de-asserted and involves the agent ISM states of CREDIT_REQ, CREDIT_INIT, and CREDIT_DONE and the fabric ISM states of CREDIT_REQ, CREDIT_ACK, and CREDIT_INIT. In some embodiments, the ISM state machine seamlessly supports two different reset states, IDLE and CREDIT_REQ. The choice of which state is the reset state can be implementation specific, with the IDLE state being the preferred choice due to favorable reset and power isolation properties. If the reset state is chosen to be the IDLE state, then an internal CREDITS_INITIALIZED flag is included within the agent to indicate that a transition from IDLE to CREDIT_REQ is to occur after reset in order to initialize credits.

Once both the agent and fabric are in the CREDIT_REQ state, the fabric ISM transitions to the CREDIT_ACK state when it is ready for credit initialization to begin. The agent ISM will then transition to the CREDIT_INIT state and proceed with transaction credit initialization. In one embodiment, the transaction credit initialization state may cause the agent to send information to the fabric regarding its available transaction queues so that the fabric can initialize its credit transaction counters with this information. In one embodiment, a credit initialization grant can be issued from a request put arbiter of the agent. The number of credits (e.g., corresponding to the number of transaction queues it has) may be indicated by maintaining this credit initialization grant signal active for a number of clock cycles corresponding to the number of transaction queues. In other implementations, the number of credits can be indicated by interface-specific signaling.

The fabric ISM next transitions to the CREDIT_INIT state where it will proceed with request credit initialization. In one embodiment, the request credit initialization state may cause the fabric to send information to the agent regarding its available request queues so that the agent can initialize its credit request counters with this information. In one embodiment, a credit initialization grant can be issued from a fabric arbiter of the fabric, and the number of credits (e.g., corresponding to the number of request queues it has) may be indicated by maintaining this credit initialization grant signal active for a number of clock cycles corresponding to the number of request queues.

When the agent has completed request credit initialization, it transitions the agent ISM to the CREDIT_DONE state. When the fabric arbiter has completed request credit initialization (and the agent ISM is in the CREDIT_DONE state), it will return to the IDLE state, at which time the agent ISM will return to the IDLE state. The fabric can reset its transaction credit counters on all arcs into the CREDIT_ACK state. Similarly, the agent can reset its request credit counters on the arc from CREDIT_REQ to CREDIT_INIT.

As further seen in FIGS. 5 and 6, both the agent and fabric ISMs include an architected ACTIVE state in which agents and fabrics may initiate transaction puts, which are requests to initiate transactions to each other. Once credit initialization has been completed and both the agent and fabric ISMs are in the IDLE state, it is possible for either side to initiate the sequence of state transitions that will result in both ISMs being in the ACTIVE state that allows them to send transactions.

If the agent is the side that first desires to send a transaction, it will first transition from the IDLE to ACTIVE_REQ state. When the fabric ISM determines that the agent ISM is in the ACTIVE_REQ state, it will also transition from the IDLE to ACTIVE_REQ state. The sequence completes with the agent ISM transitioning to the ACTIVE state when it determines that the fabric ISM is in the ACTIVE_REQ state, and the fabric ISM transitions to the ACTIVE state when it see the agent in the ACTIVE state.

If the fabric is the side that first desires to send a transaction, it will first transition from the IDLE to ACTIVE_REQ state. Once the agent ISM sees the fabric ISM in the ACTIVE_REQ state, it will also transition from the IDLE to ACTIVE_REQ, or potentially, directly to ACTIVE state, e.g., based on an agent implementation. If the agent transitions first to ACTIVE_REQ, the sequence completes with the agent ISM transitioning to the ACTIVE state. Once the fabric determines that the agent is in the ACTIVE state, it transitions to the ACTIVE state in order to complete the handshake.

In various embodiments, to expand the opportunities for idle state power management, the ISM protocol defines two specific conditions when an agent and its ISM must initiate entry into the IDLE state from the ACTIVE state. As a first set of preconditions to this required IDLE state entry by the agent ISM, the following conditions first are met: the interface has been inactive for a minimum of N clocks after the fabric ISM has entered into the ACTIVE state; the interface is not in the middle of a transaction; and the agent has advertised a minimum number of credits. As a second set of preconditions to this required IDLE state entry, the following conditions first are met: the agent ISM must transition from ACTIVE to IDLE_REQ state between clocks N+1 and M if it has returned all credits to the fabric, has no outstanding inbound or outbound non-posted requests, and the conditions for transitioning to the IDLE_REQ state have been satisfied for the preceding M–N clocks. That is, an agent that has not returned all credits or has outstanding non-posted requests may (but is not required to) transition to the IDLE_REQ state.

Note that the parameter values of M and N can be protocol specific. In one embodiment, N can be chosen as 16 and M as 32. When the agent has transitioned to its IDLE_REQ state, the fabric may either acknowledge this request to go to the IDLE state by transitioning to its IDLE state or it may not acknowledge (NAK) the request by transitioning to its IDLE_NAK state. If the fabric acknowledges the agent's request to go to the IDLE state, then the agent ISM transitions from the IDLE_REQ to IDLE state. If the fabric NAKs the agent's IDLE request, then the agent transitions from the IDLE_REQ state back to the ACTIVE state, and the wait for the M and N clocks can begin again.

The fabric not acknowledges (NAK) the agent's request if, as seen on the interface, the fabric puts a transaction in the same cycle or any cycle after the agent's ISM has transitioned to the IDLE_REQ state. In this way, a race condition can be prevented that might lead to performance degradation if the agent is allowed to go to the IDLE state due to a previous idle request that came at the same time that the fabric gave the agent more work to do.

Once the agent's ISM has reached the IDLE state, it may internally gate its own clock. In order to support trunk level clock gating of all devices that share an interface clock with the agent, the agent may also follow an additional clock request protocol to signal to the rest of the fabric that it no longer needs its clock. The clock request protocol is controlled by two signals, CLKREQ and CLKACK. Upon entering the IDLE state, the agent determines whether both CLKREQ and CLKACK are active (e.g., logic high). Once the agent determines that it no longer needs its interface clock, it may indicate this to the fabric by deasserting the CLKREQ signal. In response to the CLKREQ signal being deasserted, the fabric deasserts the CLKACK signal as an acknowledgement of the agent's request.

Figure 7:
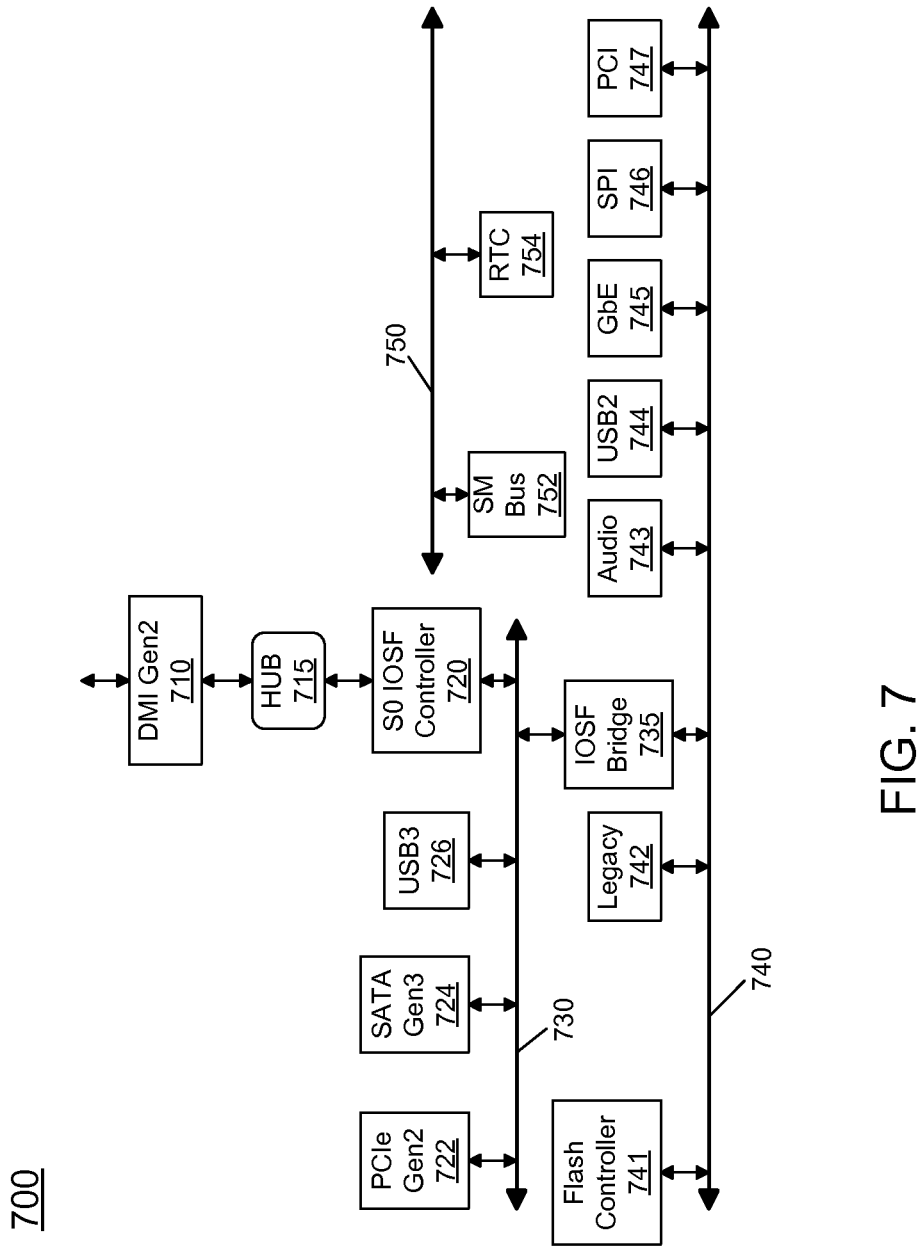
FIG. 7 is a more detailed block diagram of a portion of a SoC in accordance with an embodiment of the present invention.

Although the SoCs of FIGS. 3 and 4 are at a high level, understand that additional functionality may be present. Referring now to FIG. 7, shown is a more detailed block diagram of a portion of a SoC in accordance with an embodiment of the present invention. As shown in FIG. 7, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 7, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 7, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 7, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 7, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 7, understand the scope of the present invention is not limited in this regard.

Figure 8:
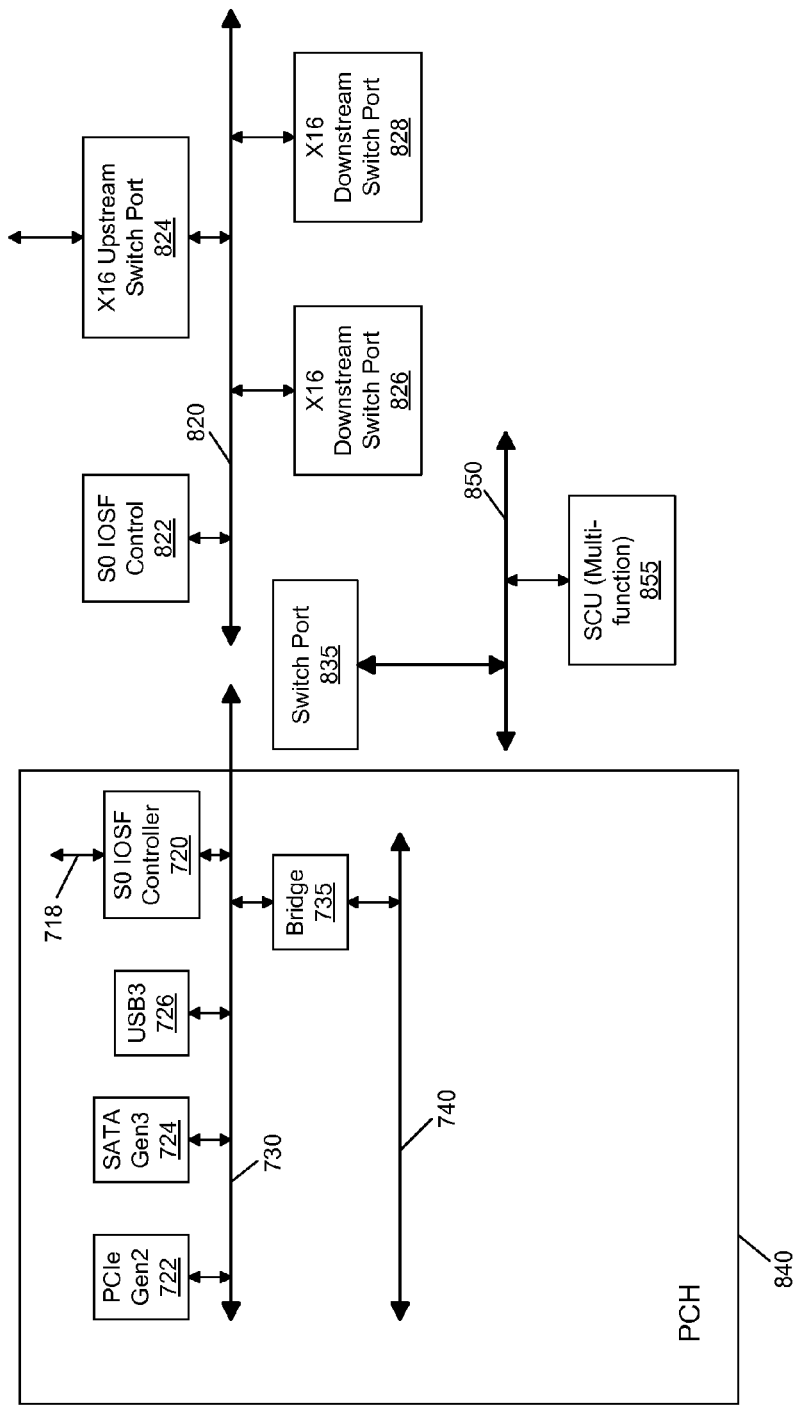
FIG. 8 is a block diagram of another SoC in accordance with an embodiment the present invention.

Still other implementations are possible. Referring now to FIG. 8, shown is a block diagram of another SoC in accordance with an embodiment the present invention. As shown in FIG. 8, SoC 800 may be configured for use, e.g., in server systems. As seen in FIG. 8, SoC may include a platform controller hub (PCH) 840, which may generally include components such as seen in the embodiment of FIG. 7. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 8).

As further seen in FIG. 8, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a fabric coupled to each of a plurality of agents via an interface having a fabric arbiter and a plurality of queues each associated with a corresponding queue of the agent, the fabric further including a fabric idle state machine (ISM) including a first set of states, wherein the fabric ISM is to transition between selected ones of the first set of states according to first state transitions to perform credit management, active mode management, and idle state management; and
the plurality of agents coupled to the fabric, each of the plurality of agents having an interface including a request put arbiter, a plurality of queues, and a plurality of credit trackers each to track credits for one of the queues of the corresponding fabric interface, and further including an agent ISM including a second set of states, wherein the agent ISM is to transition between selected ones of the second set of states according to second state transitions to perform credit management, active mode management, and idle state management, via a handshake protocol with the fabric ISM, wherein the first and second sets of states and the first and second state transitions are different.

2. The apparatus of claim 1, wherein each of the interfaces of the fabric further includes a plurality of credit trackers each to track credits for one of the queues of the corresponding agent interface.

3. The apparatus of claim 2, wherein the agent ISM is to enter a credit initialization state to initialize credits in the credit trackers.

4. The apparatus of claim 2, wherein the credit initialization is to store a number of credits in a first one of the credit trackers corresponding to the number of queues of a first channel of the agent interface for a first transaction type.

5. The apparatus of claim 4, wherein the agent ISM is to assert a credit initialization signal for a number of clock cycles corresponding to the number of queues of the first channel of the agent interface for the first transaction type.

6. The apparatus of claim 1, wherein the fabric ISM is to enter a credit initialization state to initialize credits in the credit trackers of a first agent.

7. The apparatus of claim 6, wherein the credit initialization is to store a number of credits in a first one of the credit trackers corresponding to the number of queues of a first channel of the fabric interface for a first transaction type, the fabric ISM to assert a credit initialization signal for a number of clock cycles corresponding to the number of queues of the first channel of the fabric interface for the first transaction type.

8. The apparatus of claim 1, wherein the agent ISM is to transition from an idle state to an active state to enable a first request put corresponding to a first transaction to be sent to the fabric, wherein the transition is to cause the fabric ISM to transition from an idle state to an active state.

9. The apparatus of claim 1, further comprising an on-die interconnect to couple the fabric and a first agent, wherein the fabric ISM and the agent ISM operate at a physical layer without a link layer.

10. The apparatus of claim 1, wherein the agent ISM is to transition from an active state to an idle request state if the interface of the agent has been inactive for a predetermined number of clock cycles, the interface is not communicating a transaction, and the agent has advertised minimum credits.

11. The apparatus of claim 10, wherein the agent ISM is thereafter to enter an idle state, and to clock gate a clock of the agent when in the idle state.

12. The apparatus of claim 11, wherein the agent is to deassert a clock request signal to the fabric to indicate the clock gate.

* * * * *